United States Patent [19]

Andrieu et al.

[11] Patent Number: 4,786,617

[45] Date of Patent: Nov. 22, 1988

[54] GLASS-CERAMIC ARTICLE, PROCESS FOR ITS PRODUCTION AND THERMALLY CRYSTALLIZABLE GLASS

[75] Inventors: Andre Andrieu, Nemours; Marie J. M. Comte, Paris; Frederic J. M. Ferry; Jean-Pierre Mazeau, both of Avon, all of France

[73] Assignee: Corning Glass Works, Corning, N.Y.

[21] Appl. No.: 163,528

[22] Filed: Mar. 3, 1988

Related U.S. Application Data

[63] Continuation-in-part of Ser. No. 37,042, Apr. 10, 1987, abandoned.

[30] Foreign Application Priority Data

Oct. 13, 1986 [FR] France ............................ 86 14176
Feb. 4, 1988 [FR] France ............................ 88 01288

[51] Int. Cl.$^4$ ....................... C03C 10/16; C03C 3/112
[52] U.S. Cl. ........................................... 501/3; 501/57; 501/59; 501/70
[58] Field of Search .................... 501/3, 57, 70, 59

[56] References Cited

U.S. PATENT DOCUMENTS 4,467,039 8/1984 Beall et al. .............................. 501/3
4,608,348 8/1986 Beall et al. .............................. 501/3

*Primary Examiner*—Mark L. Bell
*Attorney, Agent, or Firm*—Clinton S. Janes, Jr.

[57] ABSTRACT

This invention relates to the preparation of glass-ceramic articles in which potassium fluorrichterite and/or a related fluormica constitutes the predominant crystal phase(s). The precursor glasses can be crystallized in situ very rapidly and exhibit very little thermal deformation during the crystallization heat treatment. The base glasses are essentially free of $Li_2O$ and consist essentially, expressed in terms of weight percent on the oxide basis, of:

| $SiO_2$ | 61–70 | $Na_2O$ | 0.5–3 | BaO | 0–3.5 |
|---|---|---|---|---|---|
| $Al_2O_3$ | 2.75–7 | $K_2O$ | 2.5–5.5 | $P_2O_5$ | 0–2.5 |
| MgO | 11–16 | $Na_2O + K_2O$ | <6.8 | | |
| CaO | 4.75–9 | F | 2–3.25 | | |

8 Claims, No Drawings

GLASS-CERAMIC ARTICLE, PROCESS FOR ITS PRODUCTION AND THERMALLY CRYSTALLIZABLE GLASS

This application is a continuation-in-part application of Ser. No. 37,042, filed Apr. 10, 1987, now abandoned.

BACKGROUND OF THE INVENTION

Glass-ceramic articles are traditionally prepared through the closely controlled heat treatment of precursor glass articles. On that account, glass-ceramic articles are customarily produced by following three general steps: first, a vitrifiable batch of a predetermined composition is melted; second, this molten mass is cooled to a temperature at least within the limits of, and normally below, the transformation range and simultaneously made into the form of a glass article having a desired configuration; and, third, this glass article is exposed to a predetermined heat treatment in order to cause the generation of crystals in situ. (The transformation range has been defined as the temperature at which a molten material is transformed into an amorphous mass; this temperature in general being estimated as being in the vicinity of the annealing point of a glass.)

During the crystallization heat treatment the glass is heated to temperatures above the transformation range of the glass and whichaapproach and ordinarily go beyond its softening point. It is well known that, in these conditions, the viscosity of the glass becomes sufficiently low so that the article becomes susceptible to thermal deformation. The severity of this phenomenon obviously increases as the temperature approaches the softening point of the glass and goes beyond it.

The crystals developed in a glass-ceramic exhibit a melting point higher than the softening point of the precursor glass. Consequently, by causing crystallization in situ during the heat treatment of a parent glass article in order to convert it into a glass-ceramic, care must be taken in raising the temperature above the transformation range of the glass to develop sufficient crystallization in order to provide an adequate internal structure to support the article, thereby minimizing thermal deformation. One must also realize that the composition of the glass remaining in the article continually changes as its components become an integral part of the crystals during the heat treatment process. In most cases the viscosity of the residual glass is greater than that of the parent glass. Nevertheless, thermal deformation is an ever present problem; particularly with articles having two dimensions which are large but have narrow cross sections, such as dinner plates. Such products have required the use of formers or supports during the heat treatment of the precursor glass article in order to assure the desired geometry in the final product.

Furthermore, the in situ crystallization of a glass article is effected more rapidly and to a greater extent as the temperature is raised above the transformation range and into the region of the softening point of the glass. Consequently, for reasons of industrial economy, it is necessary to raise the temperature of crystallization as rapidly as possible up to a temperature as high as possible. Such practice obviously increases the risk of thermal deformation of the precursor glass article. Therefore, continued research has been carried out to discover glass compositions capable of rapid in situ crystallization and exhibiting only minimum, and preferably practically no, thermal deformation. These researches have been particularly active in the area of tableware articles where a primary objective has been to remove the need for formers to support the articles during the heat treatment of the parent glass bodies.

SUMMARY OF THE INVENTION

The Applicants were able to achieve that objective through the discovery of a very narrow range of glass compositions in the system $K_2O$—$Na_2O$—$MgO$—$CaO$—$SiO_2$—$Al_2O_3$—$F$, which compositions can be rapidly crystallized in situ to glass-ceramics wherein potassium fluorrichterite will preferably constitute at least the predominant, if not essentially the sole, crystal phase. In the preferred products, stringently limited concentrations of BaO and $P_2O_5$ will also be present. The degree of thermal deformation during the crystallization heat treatment of the precursor glass is so little that it is not necessary to use supports to maintain the dimensions of tableware articles, even for table plates having a diameter of about 28 cm. Furthermore, the final glass-ceramic products have a particularly pleasing aesthetic appearance for tableware, exhibiting the slight translucency associated with fine English porcelain. The tableware articles prepared from precursor glass bodies made from the inventive compositions can be heat treated up to complete crystallization by following a program having a duration as short as two hours. It is necessary to apply a glaze on these articles because the glass-ceramic articles do not display a surface gloss and are not durable enough for tableware use. As the low thermal deformation removes the need for formers, the glaze can be applied on the initial glass articles and be fired during the crystallization heat treatment.

The compositions permitting the above-mentioned objective to be achieved are composed essentially, as analyzed in weight percent on the oxide basis, of:

| | | | |
|---|---|---|---|
| $SiO_2$ | 61–70 | $Na_2O$ | 0.5–3 |
| $Al_2O_3$ | 2.75–7 | $K_2O$ | 2.5–5.5 |
| MgO | 11–16 | $Na_2O + K_2O$ | <6.8 |
| CaO | 4.75–9 | F | 2–3.25 |

Up to about 2.5% $P_2O_5$ may be included to reduce the tendency of the glass to devitrify and up to 3.5% BaO to reduce its tendencies to devitrify and to opalize.

Some $As_2O_3$ and/or $Sb_2O_3$ may be present in an amount up to 1% in order to perform their usual role as fining agents, while stabilizing the redox state of the glass. Up to about 2% total of such compatible metal oxides as $B_2O_3$, $TiO_2$, PbO, SrO, ZnO, and $ZrO_2$ can be included with no substantial adverse effect; the $B_2O_3$ level will preferably not exceed 1%.

It is possible to utilize conventional colorants for glass, such as $Fe_2O_3$, $CeO_2$, CoO, $Cr_2O_3$, CuO, $MnO_2$, NiO, and $V_2O_5$, in small amounts (typically less than 1% total).

An amount of $Fe_2O_3$ up to 0.5% produces a yellow tint in the glass-ceramic. An amount of 0.15–0.2% yields a color very near to that of English Wedgwood porcelain. Given that the yellow tint is due to the presence of the $Fe^{+3}$ ion, it is preferable to include $As_2O_3$ and/or $Sb_2O_3$ in the batch and an oxidizing ingredient, such as $NaNO_3$, in order to oxidize the glass and stabilize its redox state.

Laboratory experiments have indicated that when the parent glass bodies are heated, metastable phases are formed above 700° C. which are transformed at higher temperatures (≠950°–1050° C.) into potassium fluorrichterite (KNaCaMg$_5$Si$_8$O$_{22}$F$_2$) as the predominant crystal phase with, perhaps, one or more other crystallographically-related phases, for example, a fluormica.

With compositions of the invention in which elements are borderline with respect to the disclosed composition ranges (for example, containing 0.5% Na$_2$O or 7% Al$_2$O$_3$), the glass-ceramic probably contains, in addition to, or instead of, potassium fluorrichterie, other related phases. These phases have not been studied in detail and are not readily distinguishable from potassium fluorrichterite. Such necessary detailed study has not been deemed mandatory since the phases impart properties to the final product which are closely related to those exhibited when potassium fluorrichterite constitutes the predominant crystal phase.

A significant feature of the disclosed glasses is that they undergo a liquid-liquid phase separation when their molten masses are cooled to a glass body (they form dense opal glasses when cooled slowly). It seems that the occurrence of this phase separation, which leads to a large increase in the viscosity of the glass, is a critical factor in obtaining opaque glass-ceramics exhibiting very little thermal deformation, while applying a short crystallization heat treatment thereto. Hence, it has been visually observed that the thermal deformation of the parent glass article during the heat treatment decreases in the proportion that it demonstrates a much greater tendency to phase separate. Moreover, the viscosity measurements carried out during the crystallization heat treatment program have indicated that the phase separated glass bodies begin to crystallize at a higher viscosity than those which are practically free of phase separation, and that they retain a higher viscosity during the remainder of the heat treatment. It is believed that this behavior is due to differences in the viscosities of the residual glass matrices.

P$_2$O$_5$, F, and, to a lesser extent, Al$_2$O$_3$ and SiO$_2$, favor phase separation. In contrast, alkali metal oxides and, to a lesser extent, alkaline earth metal oxides inhibit it. Therefore, according to the amount of each of these elements, it is possible to adjust the value of the opalization liquidus (phase separation liquidus). Values ranging from about 1050° C. to 1400° C. can be obtained (a viscosity of about 3000 Pa.S and 20 Pa.S, respectively). An opalization liquidus lower than 1050° C. leads generally to a high thermal deformation, while a high opalization liquidus makes the glass difficult to form since the opalization leads to a viscosity increase.

Not only has it been observed that the low thermal deformation is related to the phase separation, but also it has been observed that it is a function of the amounts of several critical elements which have to be carefully controlled:

(1) Because MgO is a major constituent of the crystalline phases which form during the thermal treatment (especially of fluormicas and potassium fluorrichterite), too small an amount leads to insufficient crystallization which, in turn, results in excessive thermal deformation.

(2) Fluorine favors the desired crystallization: it decreases the temperature (or also increases the viscosity) at which crystallization begins. Therefore, too low an amount, i.e., less than 2%, leads to a very low viscosity before crystallization begins and, consequently, to a high thermal deformation. However, the presence of fluorine in the residual glass decreases its viscosity. This is the reason a high sag is observed when the level exceeds 3.25%

(3) BaO seems to stay mainly in the residual glass. Consequently, a too high level, viz., higher than 3.5%, leads also to a high thermal deformation.

As mentioned previously, the precursor glass bodies can be subjected to very rapid raises in temperature without undergoing substantial thermal deformation. Nevertheless, as is the case with other glass-ceramics, crystallization is associated with densification, so that too rapid raises in temperature can lead to great distortion or even breakage, if there is a thermal gradient in the articles. Such gradients exist, for example, when the thermal treatment is performed in a kiln where the front of the article is heated more rapidly than its rear. The maximum possible speed is, therefore, dependent on the furnace used and on the size and geometry of the articles. To give an idea, the temperature of the parent glass bodies should generally be raised from about 700° C. to the maximum temperature (950°–1050° C.) over a period of time of not less than 30 minutes. An exposure period of no greater than 30 minutes at this maximum temperature, typically 10–15 minutes, is sufficient to attain essentially complete crystallization.

The sensitivity of a glass to breakage due to densification thereof is also strongly dependent on its composition: the composition has an influence on the densification speed and the viscosity at which it occurs. The sensitivity of a glass to breakage increases with this speed and this viscosity. For example, it has been observed that the introduction of LiO$_2$O, in amounts of about 0.5%, frequently leads to fracture of the body during the crystallization heat treatment. This risk is particularly high in compositions which exhibit great phase separation. It is believed that Li$_2$O favors the crystallization and that breakages are related to a sudden crystallization at temperatures where the glasses have a high viscosity.

On the contrary, it has been observed that K$_2$O widens the temperature range in which densification takes place and that it decreases the breakage tendency.

The optimum maximum temperature of heating treatment is the temperature which gives the maximum opacity for a low thermal sagging. For a given composition, the opacity and the thermal sagging increase together with temperatures in the 950°–1050° C. range. In this range, the optimum maximum temperature is dependent on the composition. In particular, we have observed that it increases when the fluorine level decreases.

Furthermore, the opacity of the final glass-ceramic is strongly dependent upon the amounts of Al$_2$O$_3$ and the alkali metal oxides, and to a lesser extent, the amount of CaO:

(a) A level of Al$_2$O$_3$ less than about 2.75% leads to a product of low opacity.

(b) Similarly, an increase in the concentration of alkali metal oxides causes a decrease in opacity such that a total content of 7% yields a body of very low opacity.

(c) A too low CaO level, viz., lower than 4.75%, also gives a low opacity.

The inventive glasses exhibit crystallization liquidi in the temperature range of 1180°–1260° C. which correspond, respectively, to viscosities of 300 Pa.S and 80 Pa.S. The viscosity at the crystallization liquidus decreases with the MgO level. This is the reason the level of MgO is limited to 16%. On the other hand, P$_2$O$_5$, which probably stays in the residual glass, increases the viscosity at the crystallization liquidus. Consequently, the preferred glasses contain at least 0.5% $P_2O_5$.

Below is specified the preferred area of compositions which represent the best compromise between the physical properties of the final product and the melting, forming, and crystallization capabilities of the precursor glass. Like all the glasses disclosed here, they can be transformed through a thermal treatment of less than 2 hours into glass-ceramics displaying an opacity close to Wedgwood bone china, and they undergo only a very little thermal deformation during the heat treatment. In addition, they are particularly advantageous from the standpoint of manufacturing because their opalization and crystallization liquidi are higher than 100 Pa.S.

| $SiO_2$ | 63–70 | $K_2O$ | 3.5–5 |
|---|---|---|---|
| $Al_2O_3$ | 3–4.5 | $Na_2O + K_2O$ | >5.25–<6.75 |
| MgO | 12–14.5 | BaO | 0.75–2.25 |
| CaO | 5.5–7.5 | $P_2O_5$ | 0.5–1.5 |
| $Na_2O$ | 1–2.75 | F | 2–<3 |

They may also contain the fining agents, compatible metal oxides, and colorants mentioned above in the amounts specified.

PRIOR ART

U.S. Pat. No. 4,467,039 describes the production of glass-ceramic articles containing potassium fluorrichterite as the predominant crystal phase. It has been stated that these articles exhibit great toughness, great mechanical strength, and low thermal deformation, and that they are essentially composed, in weight percent, of:

| $SiO_2$ | 50–70 | $K_2O$ | 2–12 |
|---|---|---|---|
| MgO | 8–25 | $Li_2O$ | 0–3 |
| CaO | 4–15 | $Al_2O_3$ | 0–7 |
| $Na_2O$ | 2–9 | F | 3–8 |

Although the broad ranges of components disclosed overlap those of the present invention, there was no recognition of a narrow range of compositions which can be crystallized in situ very rapidly with nearly no thermal deformation. In fact, rates of temperature increases of 200° C./hour to the crystallization temperature and minimum exposure periods of 30 minutes at the crystallization temperature are mentioned. In contrast, the temperature of the glass bodies of the present invention can be raised at rates up to 600° C./hour and these bodies do not require more than 15 minutes at the crystallization temperature to arrive at essentially complete crystallization. No composition of the working examples furnished in this patent is within the limits of the products of the present invention.

U.S. Pat. No. 4,608,348 describes the preparation of glass-ceramic articles which demonstrate great toughness and very low thermal deformation, which contain potassium fluorrichterite as the predominant crystal phase, but which also contain substantial quantities of cristobalite. Compositions providing such products are composed essentially, in weight percent, of:

| $SiO_2$ | 65–69 | $Na_2O$ | 1.5–3.3 |
|---|---|---|---|
| $Al_2O_3$ | 0.75–3.5 | $K_2O$ | 4.2–6.0 |
| MgO | 13.5–17.5 | BaO | 0–2.5 |
| CaO | 3–4.8 | $P_2O_5$ | 0–2.5 |
| $Li_2O$ | 0.5–2.0 | F | 3.3–5.5 |

The CaO content is lower than that required in the compositions of the present invention; the F content is higher; and $Li_2O$ is a required component. Furthermore, substantial quantities of cristobalite are desired in the glass-ceramic, whereas the presence of cristobalite is neither required nor desired in the products of the present invention.

DESCRIPTION OF PREFERRED EMBODIMENTS

Table I records numerous glass compositions illustrating the compositional parameters of the present invention. The fluorine and oxide contents, except $SiO_2$, have been analyzed in terms of weight percent in the glass. The $SiO_2$ content was calculated from the batch materials. Since it is not known with which of the cations the fluorine is combined, this last is simply indicated in the table in terms of fluorine, conforming to current practice in the material analysis of glass. The actual ingredients entering into the batch for the preparation of the glass may consist of any materials, either oxides or other compounds, which, when melted together, will be transformed into the desired oxides in the correct proportions.

About 2500 grams of the batch ingredients were mixed, placed in platinum crucibles, and melted for four hours at 1500° C. The melts were formed into bars of 1 cm thickness and then transferred to an annealer operating at 600° C.

Whereas the compositions given as examples in Table I only reflect studies conducted in a laboratory, it will be realized that the compositions of the examples conforming with the compositional parameters of the invention could be melted and fashioned by means of conventional industrial equipment for melting and forming glass on a large scale.

In order to determine the resistance of each composition to thermal deformation, bars measuring 9 cm long, 1 cm wide, and 5 mm thick were cut from the annealed glass bars. These bars were then placed on a ceramic support having a span gap of 6.8 cm and introduced into an electrically-heated furnace operating at 720° C. The temperature was then raised to 800° C. at a rate of about 5° C./minute; the temperature was then raised to 1000° C. at a rate of about 16° C./minute; this temperature was maintained for 15 minutes; then the electric current to the furnace was cut off and the furnace left to cool to 800° C. at a proper rate (about 10° C./minute); and thereafter the samples were withdrawn from the furnace.

Table II furnishes the results of various measurements conducted on the crystallized samples. For example:

The degree of sag (Sag) suffered by the 5 mm thick bars was determined. Experience of thermal deformation suffered by table plates of 28 cm diameter has shown that a thermal sag of 0.75 mm in the above test is the maximum that can be tolerated in order to permit the crystallization in situ of these plates without the use of formers.

The opacity was evaluated by measuring the diffuse transmission of crystallized samples. Opacity is inversely proportional to the diffuse transmittance. The measurements have been made on samples having a thickness of 2.75 mm, a diameter of 32 mm and having their two faces polished. A small part of one face of the sample (6 mm diameter) is illuminated with a filament lamp. The transmitted light is recorded on a larger surface detector (20 mm diameter) through a ground glass diffuser which is applied against the opposite face of the sample. The diffuse transmission (Diff.) values indicated in Table II reflect an arbitrary scale. On this scale English Wedgwood bone china exhibits diffuse transmissions included in the interval of 90–110, the Limoges porcelains have diffuse transmissions lower than 10, the opal glass of trademark "Arcopal Table" has a diffuse transmission of 250 and the laminated opal glass of trademark "Corelle" a diffuse transmission of 200. It has been estimated that in order for tableware articles to look like English bone china, their diffuse transmission must be in the 40–180 range and preferably in the 50–160 range.

Moduli of rupture (MOR) were measured on abraded samples using techniques conventional in the art. The values are indicated in terms of MPa.

The opalization liquidus temperature (Opal) in °C., i.e., the phase separation liquidus, was estimated by following the amount of light reflected by the glass during cooling of the melt. The viscosity (Vis.) of the glass, at that temperature, reported in terms of Pa.S, was determined from a viscosity curve measured on the melt in the convention manner.

The crystallization liquidus temperature (Cryst.) in °C. was determined by conventional methods; i.e., the samples were subjected to isothermal treatments, then observed with an optical microscope. Again, the viscosity of the glass in Pa.S at that temperature was determined from a conventional viscosity curve measured on the glass.

Examples 1–10 are encompassed within the preferred composition region. In addition to a sag less than or equal to 0.75 mm, they display a diffuse transmission in the 50–160 range and viscosities at the opalization and crystallization liquidi higher than 100 Pa.S. Moreover, these glasses are the easiest to crystallize.

Example 7 is the most preferred: it displays the best compromise between all the properties. Examples 1, 7, 8, 9, and 10 closely approximate the color of English Wedgwood bone china. For example, a glass having the composition of Example 1 and having undergone the heat treatment described above dsplayed the color co-ordinates x=0.3135, y=0.3233, and Y=86%, (Illuminant C). As a measure of comparison, Wedgwood bone china exhibited the color coordinates x=0.3139, y=0.3232, and Y=86%. Measurements have been conducted through diffuse reflection with a white background. ground.

Examples 19–22 are located outside the specified limits. To be precise:

The $Al_2O_3$ content in Example 19 is too low. The fluorine level of Example 20 is too high. Each of those compositions exhibits excessive thermal sagging and a strong diffuse transmission.

The total $Na_2O + K_2O$ content is too high in Example 21, since the sum of $Na_2O + K_2O$ must be less than 7%. The amount of $Na_2O$ in Example 22 is excessive. Those two compositions demonstrate strong diffuse transmission.

TABLE I

| | 1 | 2 | 3 | 4 | 5 | 6 | 7 |
|---|---|---|---|---|---|---|---|
| $SiO_2$ | 66.0 | 66.9 | 65.9 | 66.7 | 65.2 | 65.5 | 67.0 |
| $Al_2O_3$ | 3.6 | 3.5 | 3.7 | 4.3 | 3.8 | 3.7 | 3.7 |
| MgO | 13.7 | 13.4 | 13.9 | 13.5 | 14.3 | 13.6 | 13.0 |
| CaO | 6.2 | 6.4 | 6.4 | 6.4 | 6.3 | 6.9 | 6.3 |
| $Na_2O$ | 2.3 | 2.2 | 2.5 | 2.2 | 2.4 | 2.3 | 1.5 |
| $K_2O$ | 4.2 | 4.1 | 3.8 | 3.6 | 4.3 | 4.3 | 4.3 |
| BaO | 1.0 | 1.0 | 1.0 | 0.9 | 1.0 | 1.0 | 1.6 |
| $P_2O_5$ | 1.1 | 1.0 | 1.2 | 0.7 | 1.2 | 1.2 | 0.9 |
| $As_2O_3$ | 0.25 | — | — | — | — | — | 0.25 |
| $Fe_2O_3$ | 0.18 | — | — | — | — | — | 0.17 |
| F | 2.6 | 2.5 | 2.7 | 2.9 | 2.6 | 2.6 | 2.4 |
| $Na_2O + K_2O$ | 6.5 | 6.3 | 6.3 | 5.8 | 6.7 | 6.6 | 5.8 |
| | 8 | 9 | 10 | 11 | 12 | 13 | 14 |
| $SiO_2$ | 65.6 | 67.3 | 66.6 | 66.7 | 66.7 | 66.6 | 68.0 |
| $Al_2O_3$ | 3.7 | 3.8 | 3.6 | 3.8 | 3.5 | 3.9 | 5.0 |
| MgO | 13.7 | 13.0 | 13.2 | 13.8 | 13.8 | 13.6 | 13.3 |
| CaO | 6.4 | 5.7 | 6.5 | 5.4 | 6.8 | 6.8 | 6.4 |
| $Na_2O$ | 1.0 | 1.5 | 2.0 | 2.3 | 1.9 | 2.3 | 2.2 |
| $K_2O$ | 4.9 | 4.3 | 4.1 | 4.2 | 3.1 | 4.1 | 3.4 |
| BaO | 1.8 | 1.6 | 1.5 | 1.1 | 1.0 | — | — |
| $P_2O_5$ | 1.0 | 0.9 | 0.6 | 1.2 | 1.5 | 1.2 | — |
| $As_2O_3$ | 0.29 | 0.26 | 0.27 | — | — | — | — |
| $Fe_2O_3$ | 0.15 | 0.17 | 0.16 | — | — | — | — |
| F | 2.5 | 2.5 | 2.5 | 2.6 | 3.0 | 2.6 | 3.0 |
| $Na_2O + K_2O$ | 5.9 | 5.8 | 6.1 | 6.5 | 5.0 | 6.4 | 5.6 |
| | 15 | 16 | 17 | 18 | 19 | 20 | 21 | 22 |
| $SiO_2$ | 67.1 | 66.1 | 65.0 | 64.6 | 67.8 | 67.0 | 65.4 | 65.9 |
| $Al_2O_3$ | 5.0 | 3.6 | 5.0 | 3.4 | 2.6 | 3.4 | 3.7 | 3.7 |
| MgO | 13.3 | 14.6 | 13.6 | 14.6 | 13.6 | 13.3 | 13.8 | 13.5 |
| CaO | 6.4 | 5.0 | 6.5 | 7.1 | 6.2 | 6.2 | 6.3 | 6.4 |
| $Na_2O$ | 2.2 | 2.3 | 2.2 | 2.3 | 2.2 | 2.1 | 2.7 | 3.2 |
| $K_2O$ | 3.4 | 3.5 | 4.1 | 3.9 | 4.1 | 4.1 | 4.3 | 3.5 |
| BaO | 0.9 | 0.9 | 1.0 | 0.9 | 0.9 | 0.9 | 1.0 | 0.9 |
| $P_2O_5$ | — | 2.1 | 1.0 | 1.5 | 1.0 | 1.0 | 1.2 | 1.4 |
| $As_2O_3$ | — | — | — | — | — | — | — | — |
| $Fe_2O_3$ | — | — | — | — | — | — | — | — |
| F | 3.0 | 3.25 | 2.7 | 3.0 | 2.7 | 3.5 | 2.7 | 2.6 |
| $Na_2O + K_2O$ | 5.6 | 5.8 | 6.3 | 6.2 | 6.3 | 6.2 | 7.0 | 6.7 |

TABLE II

| | 1 | 2 | 3 | 4 | 5 | 6 | 7 |
|---|---|---|---|---|---|---|---|
| Sag | 0.25 | 0.25 | 0.25 | 0.25 | 0.25 | 0.5 | 0.25 |
| Diff. | 130 | 153 | 150 | 109 | 145 | 141 | 104 |
| MOR | — | 83 | — | 83 | — | — | — |
| Opal | | | | | | | |
| Temp. | — | 1160 | — | 1220 | — | — | 1210 |
| Vis. | — | 600 | — | 220 | — | — | 220 |
| Cryst. | | | | | | | |
| Temp. | — | 1220 | — | 1240 | — | — | 1240 |
| Vis. | — | 200 | — | 160 | — | — | 160 |
| | 8 | 9 | 10 | 11 | 12 | 13 | 14 |
| Sag | 0.25 | 0.5 | 0.5 | 0.5 | 0.25 | 0.25 | 0.25 |
| Diff. | 95 | 106 | 127 | 180 | 60 | 138 | 150 |
| MOR | — | — | — | — | 76 | — | — |
| Opal | | | | | | | |
| Temp. | 1230 | 1200 | — | — | 1380 | 1200 | — |
| Vis. | — | — | — | — | 30 | 240 | — |
| Cryst. | | | | | | | |
| Temp. | — | — | — | — | 1220 | 1220 | — |
| Vis. | — | — | — | — | — | 180 | — |
| | 15 | 16 | 17 | 18 | 19 | 20 | 21 | 22 |
| Sag | 0.5 | 0.25 | 0.25 | 0.25 | 1.0 | 3.0 | 0.75 | 0.5 |
| Diff. | 100 | — | 100 | 165 | 316 | 242 | 295 | 254 |
| MOR | — | — | 76 | 83 | — | — | — | — |
| Opal | | | | | | | | |
| Temp. | 1200 | — | 1240 | — | 1140 | 1280 | — | — |
| Vis. | 280 | — | 140 | — | — | 90 | — | — |
| Cryst. | | | | | | | | |
| Temp. | 1240 | — | 1240 | 1220 | — | — | — | — |
| Vis. | 160 | — | 140 | 120 | — | — | — | — |

We claim:

1. A glass-ceramic article containing potassium fluorrichterite and/or a related fluormica as the predominant crystal phase(s) which, in the form of bars measuring 9 cm×1 cm×5 mm, will exhibit sagging during the crystallization heat treatment not greater than 0.75 mm over a span of 6.8 cm, and which displays such opacity that the diffuse transmittance of a sample of 2.75 mm thickness is in the 40-180 range, said glass-ceramic article having a composition essentially free of $Li_2O$ and consisting essentially, as expressed in terms of weight percent on the oxide basis, of:

| $SiO_2$ | 61-70 | $Na_2O$ | 0.5-3 | BaO | 0-3.5 |
|---|---|---|---|---|---|
| $Al_2O_3$ | 2.75-7 | $K_2O$ | 2.5-5.5 | $P_2O_5$ | 0-2.5 |
| MgO | 11-16 | $Na_2O + K_2O$ | <6.8 | | |
| CaO | 4.75-9 | F | 2-3.25 | | |

2. A glass-ceramic article according to claim 1 characterized in that it consists essentially of:

| $SiO_2$ | 63-70 | $K_2O$ | 3.5-5 |
|---|---|---|---|
| $Al_2O_3$ | 3-4.5 | $Na_2O + K_2O$ | >5.25-<6.75 |
| MgO | 12-14.5 | BaO | 0.75-2.25 |
| CaO | 5.5-7.5 | $P_2O_5$ | 0.5-1.5 |
| $Na_2O$ | 1-2.75 | F | 2-<3 |

3. A glass-ceramic article according to claim 1 characterized in that it also contains up to 4% total of at least one member in the indicated proportion of the following groups consisting of up to 1% total of $Fe_2O_3$, $CeO_2$, CoO, $Cr_2O_3$, CuO, $MnO_2$, NiO, and $V_2O_5$, up to 2% total of $B_2O_3$, PbO, SrO, ZnO, $TiO_2$, and $ZrO_2$, and up to 1% total of $As_2O_3$ and $Sb_2O_3$.

4. A glass-ceramic article according to claim 1 characterized in that it is a tableware article.

5. A thermally crystallized glass characterized in that it is capable of being crystallized in situ in a period of two hours to form a highly crystalline glass-ceramic article containing potassium fluorrichterite and/or a related fluormica as the predominant crystal phase(s) and which, in the form of bars measuring 9 cm×1 cm×5 mm, will exhibit sagging during the crystallization heat treatment not greater than 0.75 mm over a span of 6.8 cm, said glass-ceramic article having a composition essentially free of $Li_2O$ and consisting essentially, as expressed in terms of weight percent on the oxide basis, of:

| $SiO_2$ | 61-70 | $Na_2O$ | 0.5-3 | BaO | 0-3.5 |
|---|---|---|---|---|---|
| $Al_2O_3$ | 2.75-7 | $K_2O$ | 2.5-5.5 | $P_2O_5$ | 0-2.5 |
| MgO | 11-16 | $Na_2O + K_2O$ | <6.8 | | |
| CaO | 4.75-9 | F | 2-3.25 | | |

6. A thermally crystallizable glass according to claim 5 characterized in that said glass consists essentially of:

| $SiO_2$ | 63-70 | $K_2O$ | 3.5-5 |
|---|---|---|---|
| $Al_2O_3$ | 3-4.5 | $Na_2O + K_2O$ | >5.25-<6.75 |
| MgO | 12-14.5 | BaO | 0.75-2.25 |
| CaO | 5.5-7.5 | $P_2O_5$ | 0.5-1.5 |
| $Na_2O$ | 1-2.75 | F | 2-<3 |

7. A thermally crystallizable glass according to claim 6 characterized in that said glass displays a viscosity at the opalization liquidus higher than 100 Pa.S and a viscosity at the crystallization liquidus higher than 100 Pa.S.

8. A thermally crystallizable glass according to claim 5 characterized in that it also contains up to 4% total of at least one member in the indicated proportion of the following groups consisting of up to 1% total of $Fe_2O_3$, $CeO_2$, CoO, $Cr_2O_3$, CuO, $MnO_2$, NiO, and $V_2O_5$, up to 2% total of $B_2O_3$, PbO, SrO, ZnO, $TiO_2$, and $ZrO_2$, and up to 1% total of $As_2O_3$ and $Sb_2O_3$.

* * * * *